US006472605B1

(12) United States Patent
Griffith

(10) Patent No.: US 6,472,605 B1
(45) Date of Patent: Oct. 29, 2002

(54) FRANGIBLE WORK COVER FOR BREAKER BOX

(76) Inventor: Larry D. Griffith, 1204 Morgan St., Fort Collins, CO (US) 80524

( * ) Notice: Subject to any disclaimer, the term of this patent is extended or adjusted under 35 U.S.C. 154(b) by 0 days.

(21) Appl. No.: 09/549,136

(22) Filed: Apr. 13, 2000

(51) Int. Cl.[7] ............................................. H01B 17/00
(52) U.S. Cl. ............................ 174/149 R; 174/70 B; 174/99 B; 174/101
(58) Field of Search ..................... 174/66, 68.2, 70 B, 174/71 B, 72 B, 88 B, 99 B, 101, 138 F, 149 B; 361/624, 637, 638, 639, 648, 649, 657, 658, 667

(56) References Cited

U.S. PATENT DOCUMENTS

| 4,444,455 A | * | 4/1984 | Wiancko et al. ......... 339/258 F |
| 5,272,591 A | * | 12/1993 | Blue et al. ................. 361/622 |
| 5,272,592 A | * | 12/1993 | Harris et al. ............... 361/637 |
| 5,816,850 A | * | 10/1998 | Yamada et al. ............. 439/507 |

\* cited by examiner

*Primary Examiner*—Dean A. Reichard
*Assistant Examiner*—W. David Walkenhorst
(74) *Attorney, Agent, or Firm*—David S. Woronoff

(57) ABSTRACT

A frangible cover, generally made of a synthetic material, such as plastic, which fits over and grips the "hot" or energized bus bars in an electrical breaker box and fits under the insulating panel fingers in the breaker box. In this arrangement, the novel frangible cover is locked in place in the breaker box until the installer acts to remove all or part of the cover. The cover is scribed in a pattern so that it can be partially removed one or more breakers at time as intended by the breaker installer. The physical configuration of the present invention is mated to the physical configuration of the breaker box itself. The present frangible cover is designed to mate with the extending finger of the phase line bus bar and engage the tab of the insulating strip as if it were a breaker or plurality of breakers.

6 Claims, 6 Drawing Sheets

FRANGIBLE WORK COVER FOR BREAKER BOX

BACKGROUND OF THE INVENTION

The present invention relates to the invention of a novel frangible or breakable cover which engages the neutral strip of a breaker box and the outwardly extending fingers of the "hot" bus bars including snap-on, bolt-on, and other types of commercially available breaker boxes, such as the QO Load Center manufactured by the Square D Company.

1. Field of the Invention

The present invention relates to the field of protective devices for electrical breaker boxes. In particular the present invention relates to the provision of a frangible cover for a breaker box in which the frangible cover hides the "hot" or "live" bus bars prior to the installation of the desired breakers in the box. This enables the installer to add breakers while the box is "live" without the risk of electrical shock.

2. Description of the Prior Art

The closest prior art known to the applicant is shown in U.S. Pat. Nos. 4,327,841 and 2,167,419. Neither of these patents shows either the physical structure or the function taught by the present invention.

SUMMARY OF THE INVENTION

The present invention teaches, in two embodiments, novel frangible covers, generally made of a synthetic material, such as plastic, which fits over and grips the "hot" or energized bus bars in an electrical breaker box and fits under the insulating panel "L" shaped tabs in one style of breaker box or grips the generally cylindrically shaped insulating bars in the Square D style breaker box. In this arrangement, the novel frangible cover is locked in place in the breaker box until the installer acts to remove all or part of the cover. The cover is scribed in a pattern so that it can be partially removed one or more breakers at time as intended by the breaker installer.

The physical configuration of the present invention is mated to the physical configuration of the breaker box itself. The inventive concept is not so limited. As typically configured a breaker box has one or two nearly centrally located bus bars each carrying one phase of line power. Running parallel to each bus bar and on the outside thereof are insulating panel members which have a series of "L" shaped tabs or cylindrically shaped rods extending outwardly upon which the breakers are fitted and then rotated into position on the bus bar fingers. Each bus bar, in one style breaker box has mounted or formed thereon a plurality of outwardly extending hands with two fingers formed on each end. In the Square D style box the bus bar has an outwardly extending finger to be gripped by the breaker. The bus bar fingers reach out on either side of the center line formed between the bus bars. When a breaker is installed it is with a snap or compression fit between the tab or rod of the insulating panel and a finger of the phase bus bar.

The present inventive frangible cover, in either embodiment, is designed to mate with the extending finger of the phase line bus bar and engage the tab of the neutral line bus bar as if it were a breaker or plurality of breakers.

DESCRIPTION OF THE PREFERRED EMBODIMENT

Figure 1:
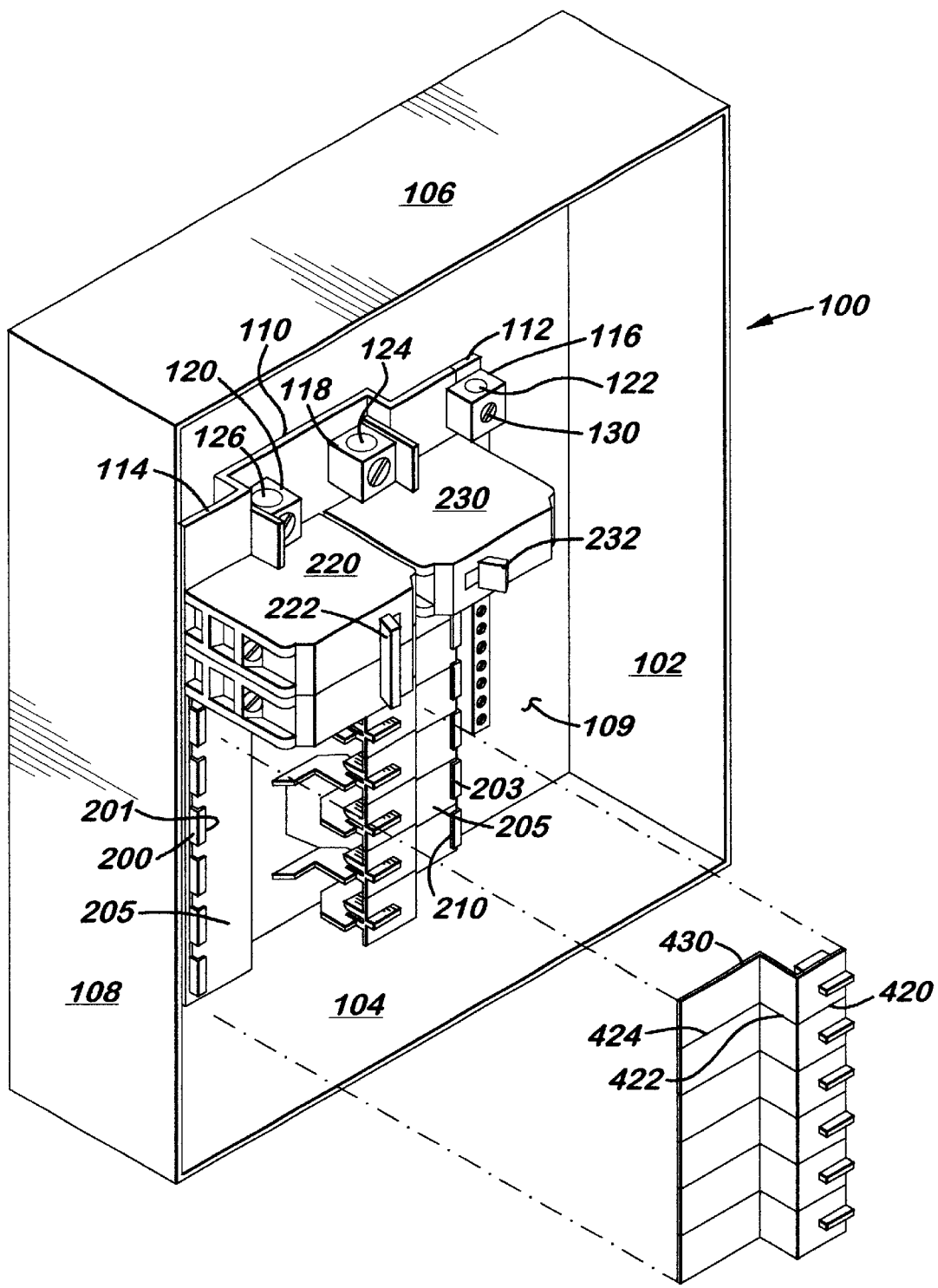
FIGS. 1 and 8 show a front perspective view of two embodiments of the present invention showing a breaker box with two breakers installed.

FIG. 1 is perspective view of a first embodiment of the present invention in which an electrical breaker box shown generally by the number 100. A breaker box has four sides 102, 104, 106 and 108 and a base 109. A cover not shown fits over the breaker box and is normally hinged from one of the sides.

Attached to the base 109 of the breaker box is an insulating panel 110 to which is connected base 109. Running in parallel lines spaced apart from each other are five strips: insulating strip 200, having extending "L" shaped lugs 201; "hot" phase A, 130, formed in a hand like shape with outwardly extending fingers 132, 134; "hot" phase B, 140, formed in a mirror image hand like shape of phase A, having fingers 142, 144; insulating strip 210, having "L" shaped lugs 203; and ground bus 220. Electrical power is applied by wire, as shown in FIG. 2, to input terminals 116, 118, 120 which are fitted with channels 122, 124 and 126 to receive the wire and threaded screws, not numbered, to lock the input wire in place.

Figure 2:
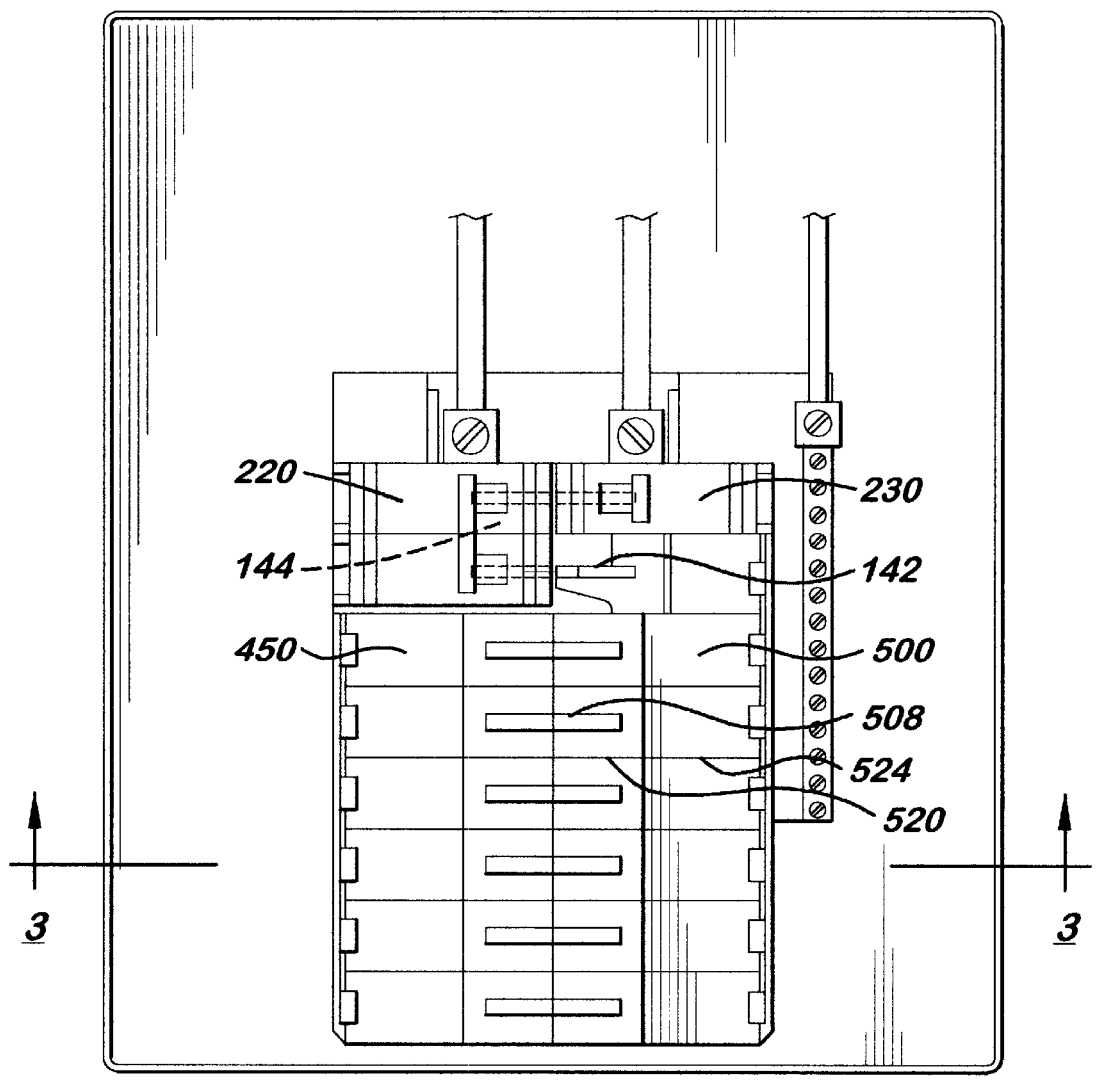
FIGS. 2 and 9 are a front view of the embodiment shown in FIGS. 1 and 8 showing two of the present inventive frangible covers in place in each style breaker box.
Figure 3:
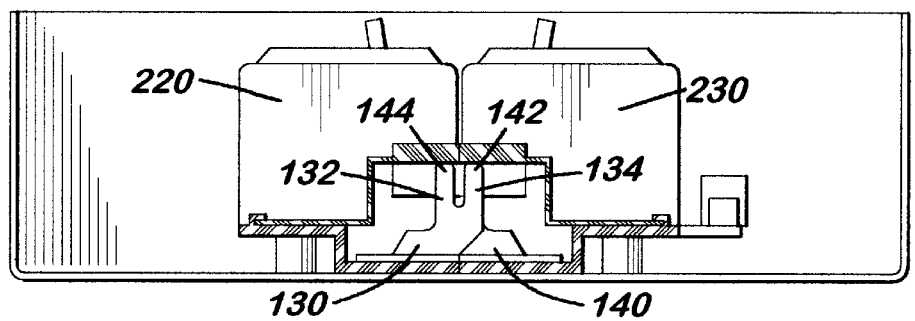
FIGS. 3 and 10 show a section view of the embodiment of the present invention shown in FIGS. 2 and 9 in which the section is taken along the line 3—3 shown in FIGS. 2 and 9.
Figure 4:
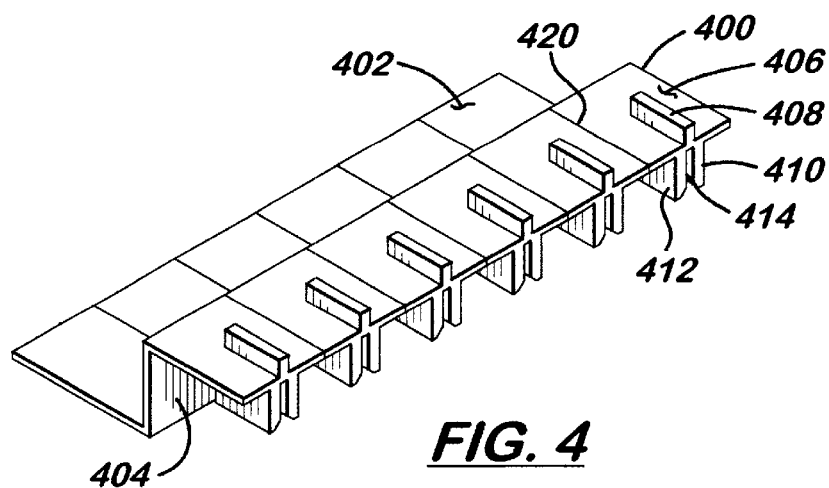
FIGS. 4 and 11 show a detail, in perspective, of each embodiment of the present invention shown in FIGS. 1, 8 and 2, 9 and 3, 10.
Figure 5:
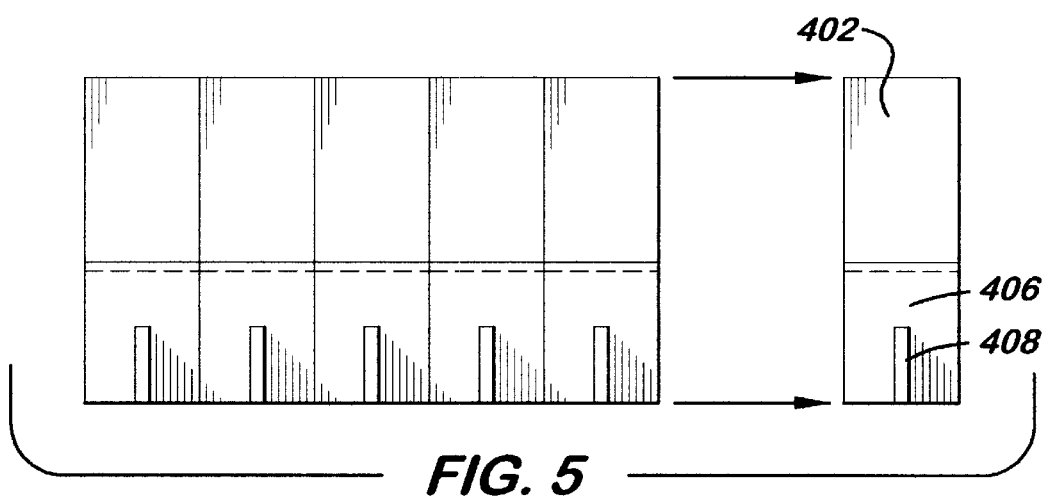
FIGS. 5 and 12 show a top view of novel frangible cover being a part of an embodiment of the present invention shown in FIGS. 4 and 11, respectively.
Figure 6:
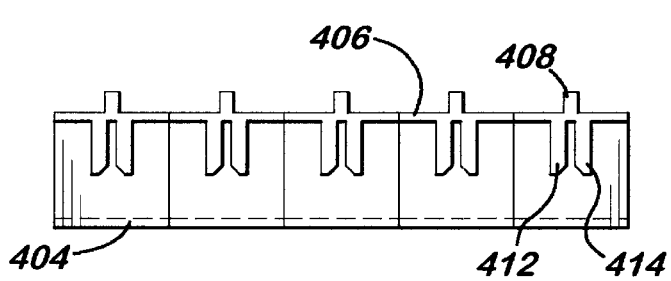
FIGS. 6 and 13 show a front view of the embodiment of the present invention shown in FIGS. 4 and 11.
Figure 7:
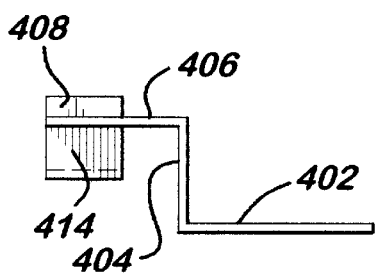
FIGS. 7 and 14 shows a side view of the embodiment shown in FIGS. 6 and 13.

Electrical breakers are shown in FIGS. 1, 2 and 3. Breaker 220 is for applying the power of both phases to a circuit and breaker 230 for applying the power of a single phase to a circuit. Each breaker has a reset toggle switch 222 and 232 respectively as shown in FIG. 1. The breakers attach to the breaker box in the well known manner of frictionally engaging one or more fingers on one or more phase bars and snapping in place on the appropriate side insulating panels "L" shaped tabs as shown in the Figures. The breakers essentially meet in the middle of the space between the phase buses.

The description for the embodiment of the present invention shown in FIGS. 8 through 14 is virtually identical to that shown and described for FIGS. 1 through 7 with the following exceptions. Like parts in the drawings get like number except that those parts in the FIGS. 8 through 14 embodiment are in the 1000 series. That is part 100 and 1000 are similar in structure and function.

Figure 8:
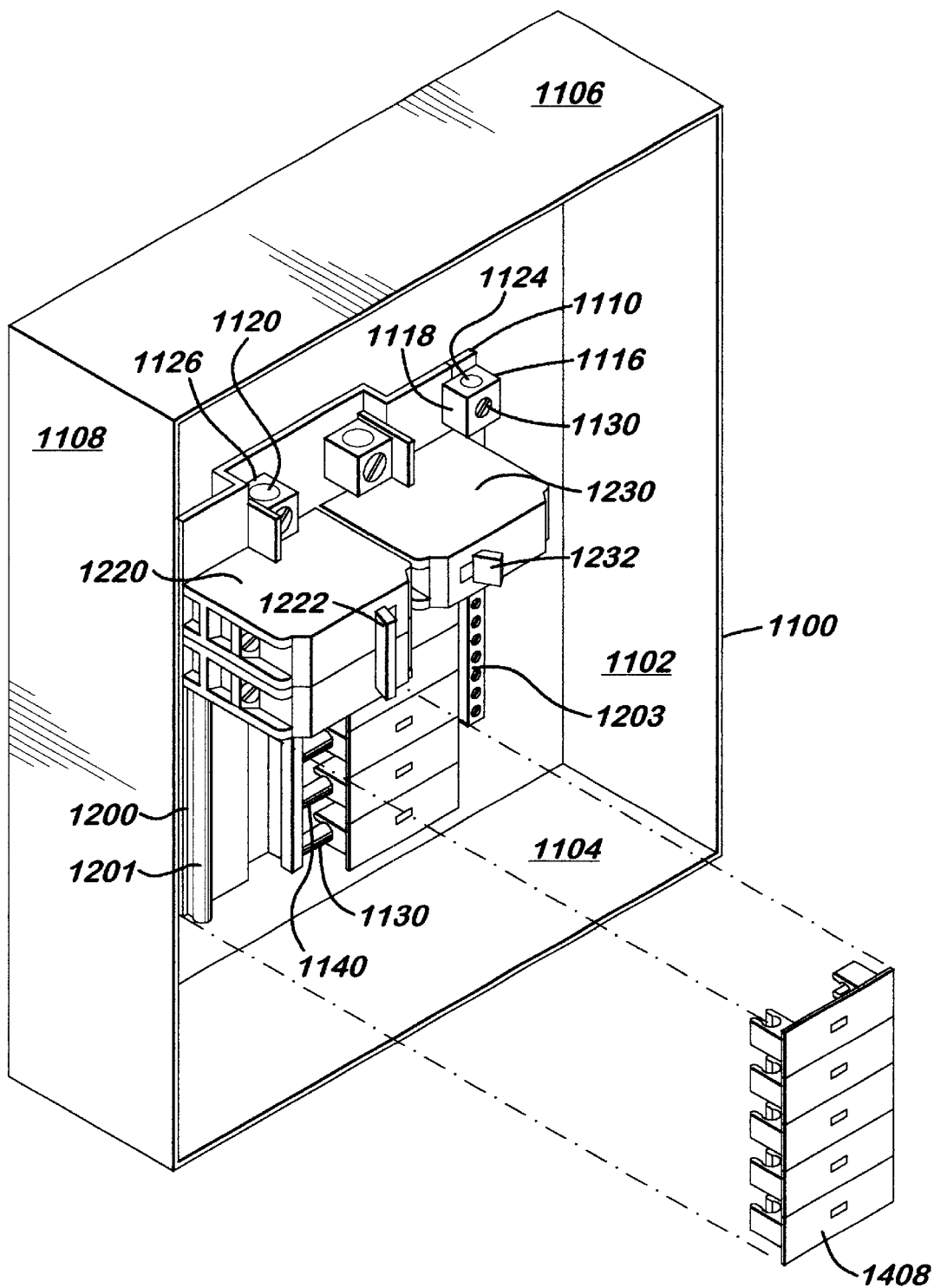
Figure 9:
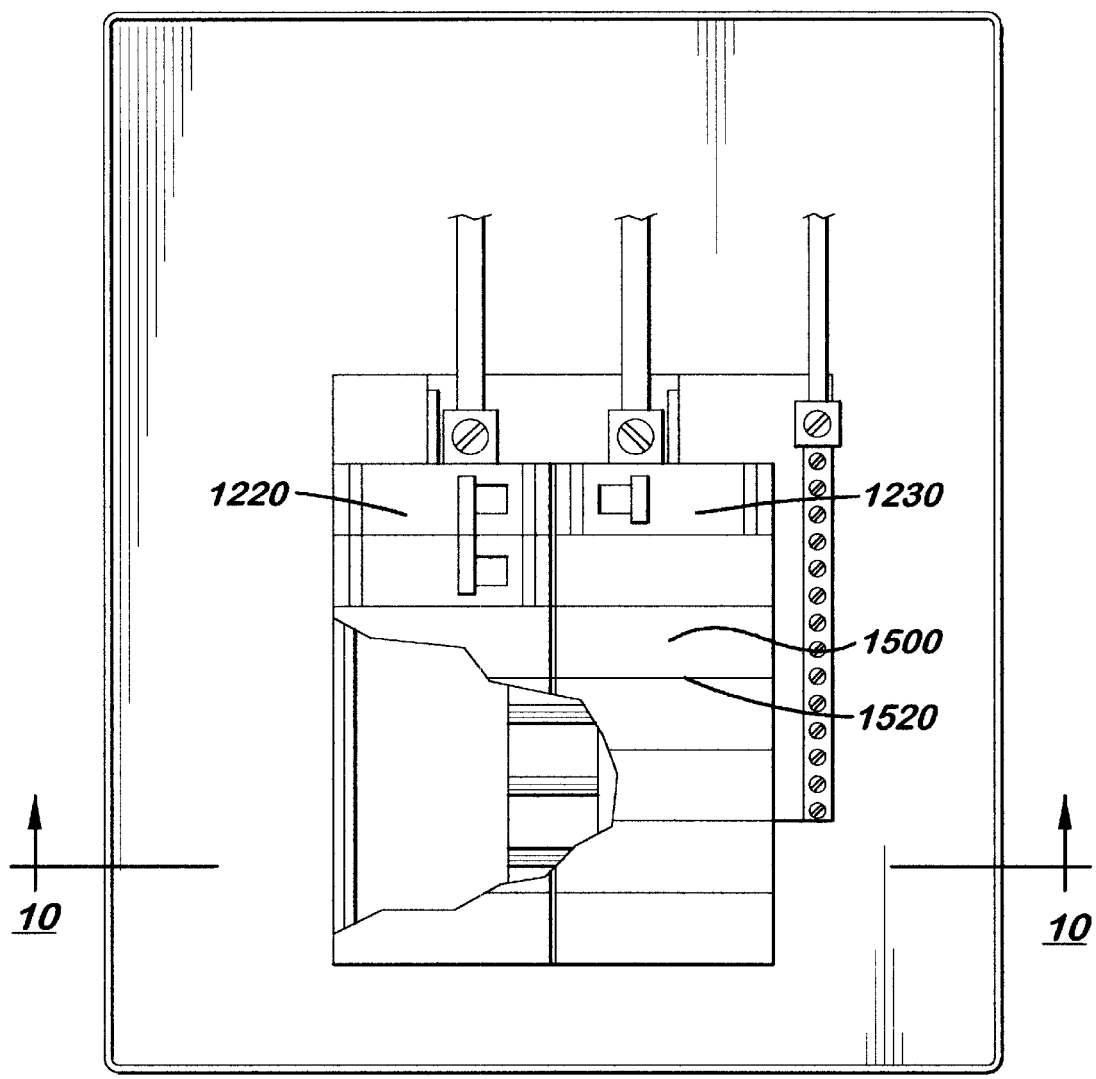
Figure 10:
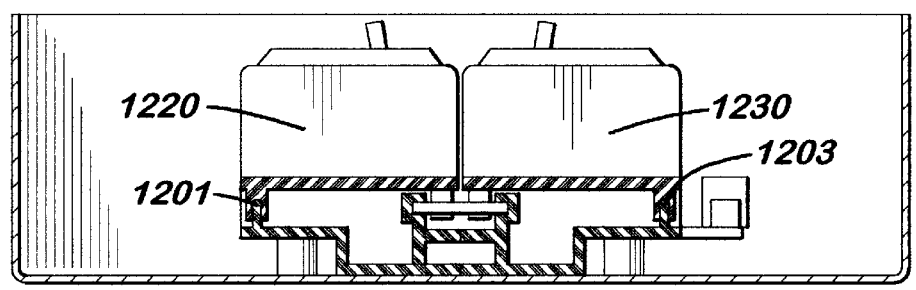
Figure 11:
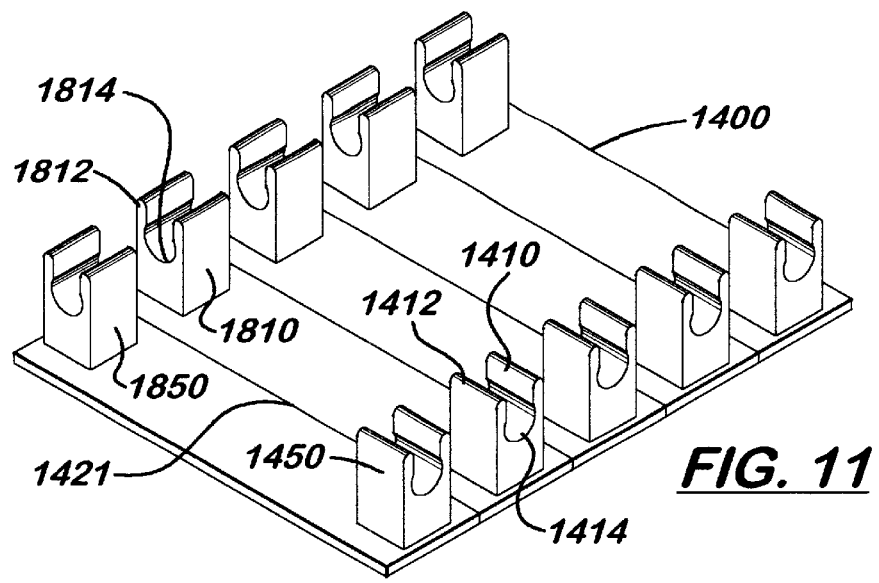

The insulation, 1201, 1203 shown in FIGS. 8 and 10, gripped by the breaker as it is rotated into position to grip the conductive bus bar is formed into a cylindrical shape. The conductive bus bar is a more simple outwardly extending finger shown in FIGS. 8 and 9 as elements 1130 and 1140.

Before the present invention, when the breakers were installed in a live box, the installer risked shock if he or she touched both a neutral bus or grounded conductive material and phase bus while in the act of either removing or installing breaker. The present invention eliminates that risk when the installer works in a live box.

As shown in FIGS. 4, 5, 6, and 7, a strip of relatively rigid insulating material, 400, normally a molded plastic material, is formed into a "two step" shape having a first flat ramp member 402, a second flat ramp member 404 formed substantially perpendicular to the first ramp member and extending outwardly therefrom and a third ramp member 406 extending perpendicularly from the second ramp surface 404 and substantially parallel to the first ramp surface 402 to form first cover member 450 and second cover member 500. In fact, although when in place in the breaker box, the cover members 450 and 500 appear to be mirror images, the members 450 and 500 are simply identical strips turned to face each other. The same is true for cover members 1450 and 1500 shown in the second embodiment of the present invention.

Figure 12:
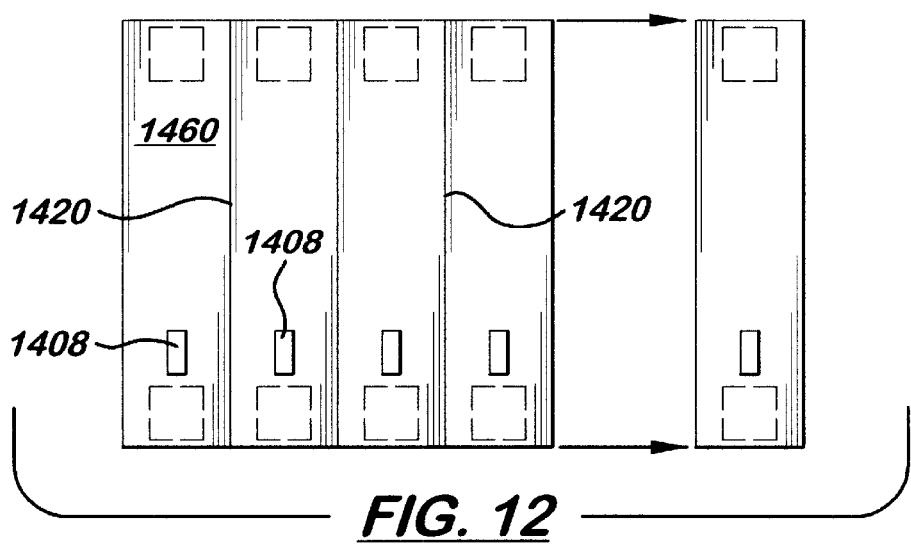
Figure 13:
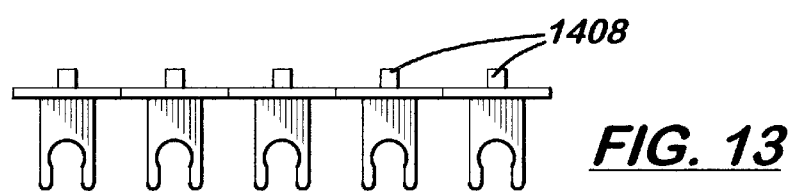
Figure 14:
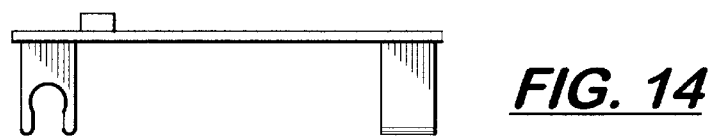

The second embodiment of the present invention, shown in more detail in FIGS. 11, 12, 13 and 14, has a flat base portion on which is formed or mounted on an "upper" side, as shown in FIG. 12, a grip portion 1408, and on the "under" side, two similar gripper members rotated ninety degree from each other, 1450 and 1850 respectively. Scribe lines 1420 and 1420 are formed in the upper and lower surface of the cover members for permitting them to be easily separated into a number of cover members. The protective strip member 1400 has two rows of gripper members. The first gripper members are arranged with generally "U" shaped opening formed of legs 1810 and 1812 to form the open "U" shaped gripper to grasp the mounting cylinder 1201 or 1203. The "U" shaped opening is proportioned to provide a tight frictional grip on the mounting cylinder. The other gripper members 1450 are turned ninety degrees from the first gripper members 1850 and have legs 1410 and 1412 forming "U" shaped opening 1414 for gripping the conductor members 1130 and 1140.

When in use, the installer removes a portion of the cover member indicated by the scribe line or lines, usually one strip at a time and then installs the proper breaker. Thus the installer has eliminated his risk of striking a hot phase bar during installation since the other remaining phase bars are covered by insulating cover members 450 and 500.

The third ramp surface 406 has an outwardly extending handle member 408 and inwardly depending finger members 410 and 412 with a channel 414 formed therebetween. The width of the channel members is such that the form a tight frictional fit around the finger members of the phase bus bars, 132, 134, 142, and 144. The thickness 430 of the first ramp member is slightly less than the height of the "L" shaped member of the neutral bus bar above its main surface.

A scribe line 420 is formed on the outer surface of each ramp member which weakens the surface of the ramp members permitting them to be broken away into separate ramp elements and removed as separate elements. A similar scribe line 421 may be formed on the inner surface of the frangible member easing the process of separating the ramp member into several separate ramp members. When looking at the breaker box shown in FIGS. 1 and 2 it appears as if there are two different.

The embodiments of the present invention which have been shown and described are illustrative of the main principles of the invention but the following claims shall not be limited to the embodiments shown. The claims are intended to cover and do cover those variations of the invention which are apparent to those skilled in the art.

I claim:

1. An apparatus for covering the phase bus bars of an electrical breaker box comprising in combination:
   first and second individually removable cover members of a rigid but separable strip of electrical insulation material having a first ramp member, a second ramp member and a third ramp member wherein the first and third ramp members are substantially parallel to each other and are joined together by a second ramp member;
   said third ramp member has formed thereon on the outer surface a handle member and on the inside surface inwardly depending first and second finger members.

2. The apparatus claimed in claim 1 including further one or more scribe lines formed on the first and second individually removable cover members first, second, and third ramp members for permitting the separation of the cover members into separate sub-cover members.

3. The apparatus claimed in claim 2 wherein first and second finger members of the third ramp member are spaced apart by a distance slightly less than the thickness of a phase bus bar member to grip it frictionally.

4. The apparatus claimed in claim 3 wherein the neutral bus bar has an "L" shaped portion, the thickness of the first ramp member is slightly less than the height of the "L" shaped portion of the neutral bus bar above its main surface.

5. An apparatus for gripping the conductive members of an electrical panel box comprising in combination:
   first and second insulating members formed of a relatively rigid but separable strip each having an inner and outer surface;
   said outer surface of said first and second insulating members having a handle means formed thereon;
   said inner surface of said first and second insulating members having first and second gripping members formed thereon wherein first gripping member connects to an insulating member and said second gripping member connects to a conducting member.

6. The apparatus claimed in claim 5 including further:
   said first and second gripping members each have a "U" shaped. grip in which the "U" shaped grips are arranged in the same plane but rotated ninety degrees with respect to each other.

* * * * *